United States Patent [19]
Kobayashi et al.

[11] Patent Number: 5,177,641
[45] Date of Patent: Jan. 5, 1993

[54] STRUCTURE FOR HOLDING LENS IN LENS HOLDING MEMBER

[75] Inventors: Tomoaki Kobayashi, Niigata; Hiroshi Nomura; Thogi Kondo, both of Tokyo, all of Japan

[73] Assignee: Asahi Kogaku Kogyo Kabushiki Kaisha, Tokyo, Japan

[21] Appl. No.: 605,451

[22] Filed: Oct. 30, 1990

[30] Foreign Application Priority Data

Oct. 31, 1989 [JP] Japan .................. 1-128168

[51] Int. Cl.⁵ .................................. G02B 7/02
[52] U.S. Cl. ........................ 359/820; 359/819; 359/830
[58] Field of Search ............ 359/819, 820, 818, 830

[56] References Cited

U.S. PATENT DOCUMENTS

| | | | |
|---|---|---|---|
| 3,205,774 | 9/1965 | Estes | 359/820 |
| 3,671,108 | 6/1972 | Kilgus | 359/820 |
| 3,689,134 | 9/1972 | Leitmeir et al. | 359/830 |
| 4,302,076 | 11/1981 | Hashimoto | 359/830 |
| 4,668,047 | 5/1987 | Okura | 359/819 |
| 4,737,017 | 4/1988 | Nagasaka | 359/819 |

FOREIGN PATENT DOCUMENTS

59-48512 3/1984 Japan .
62-164305 10/1987 Japan .

Primary Examiner—Loha Ben
Attorney, Agent, or Firm—Sandler, Greenblum & Bernstein

[57] ABSTRACT

Lenses, which include at least one plastic lens, are supported in a lens barrel by a lens holding structure which includes shoulder surfaces and inner circumferential surfaces of a lens barrel, at least one annular elastic member, and a retainer ring. The lenses are radially positioned in coaxial alignment with the lens barrel by the inner circumferential surfaces of the lens barrel, and axially positioned in engagement with the shoulder surfaces by the elastic member and the retainer ring. The elastic member elastically presses one of the lenses against one of the shoulder surfaces, and the retainer ring is threadedly mounted on the outer end of the lens barrel end holds the other lens against the other shoulder surface. Annular spacers may be disposed between the outer circumferential edges of the lenses and the inner circumferential surfaces of the lens barrel, for holding the lenses in coaxial alignment with the lens barrel.

17 Claims, 5 Drawing Sheets

STRUCTURE FOR HOLDING LENS IN LENS HOLDING MEMBER

BACKGROUND OF THE INVENTION

1. Field of the Invention

The present invention relates to a lens holding member or lens barrel for use in an optical device, and more particularly to a lens holding structure for holding a lens system in a lens holding member or a lens barrel for use in an optical instrument.

2. Description of the Relevant Art

Optical instruments with lenses, such as cameras, binoculars, collimators, or the like are required to support the lenses accurately in a desired position. To meet this requirement, the optical devices have a lens barrel or a lens holding member with reference portions for engaging the lenses. When the lenses, which are usually circular in shape, are supported in the lens barrel, they are accurately positioned when their circumferential edges are engaged by the reference portions of the lens barrel. Typically, a lens holding member for a camera comprises a portion of the body of the camera or the lens barrel of a camera lens unit, and a lens holding member for a binocular comprises the lens barrel of the binocular. Each reference portion for engagement with a lens may comprise a shoulder on the inner wall surface of a lens barrel and an inner circumferential surface, adjacent to the shoulder, of the lens mount. When the circumferential surface of the lens on one side thereof is engaged by the shoulder, the lens is positioned along its optical axis (i.e., in the axial direction of the lens barrel). When the outer circumferential edge of the lens is engaged by the inner circumferential surface of the lens barrel, the optical axis of the lens is aligned with the central axis of the lens barrel. The lens which is thus positioned as desired in the lens barrel is fixed to the lens barrel by either a retainer ring that is force-fitted or threaded into the lens barrel or a plurality of screws. The retainer ring or screws are held in direct engagement with the lens, thereby rigidly holding the lens in the lens barrel.

Precision optical devices such as high-quality cameras, for example, include lens barrels made of a metallic material such as an aluminum alloy. The most general material of lenses is glass. The glass material has a thermal expansion coefficient which is not largely different from that of the metallic material. Therefore, when a glass lens is supported in a metallic lens barrel, any difference between the thermal expansion coefficients of the lens and the lens barrel does not adversely affect the rigid lens holding structure at considerably high or low temperatures. This is because the lens remains appropriately supported in the lens barrel due to slight elastic deformation of the lens mount or retainer ring.

In recent years, lenses of synthetic resin have been widely used because of their advantages resulting from reduced weight and high productivity. Since, however, the thermal expansion coefficient of synthetic resin lenses is much greater than those of metallic materials, it is difficult to support a synthetic resin lens rigidly in a metallic lens barrel. More specifically, both diameter and thickness of the synthetic resin lens increase at higher temperatures. The increase in the lens diameter may be absorbed by a clearance between the outer circumferential edge of the lens and the inner circumferential surface of the lens barrel. Alternatively, an elastic spacer may be disposed between the outer circumferential surface of the lens and the inner circumferential surface of the lens barrel, as disclosed in U.S. patent application Ser. No. 07/580,467 filed Sep. 11, 1990 which is entitled "STRUCTURE FOR HOLDING AN OPTICAL ARTICLE" and assigned to the same assignee as the assignee of the present application, now abandoned. With the above arrangements, the lens holding structure is completely free from problems which would otherwise be caused by temperature-dependent changes in the lens diameter.

However, temperature-dependent changes in the lens thickness are liable to cause the lens to be appreciably shifted in position in the axial direction. If the lens is supported using the aforesaid rigid lens holding structure, then any large thermal expansion of the synthetic resin lens at higher temperature forces the lens and the metallic lens barrel to be deformed beyond elastically deformable limitations, resulting in plastic deformations or permanent deformations of the lens and/or the lens mount. Once the lens and/or lens barrel has been permanently deformed, the lens is no longer firmly supported in the lens barrel when the temperature drops again, so that images which are formed by the lens tend to be poor in quality.

Several efforts to solve the problems resulting from temperature-dependent changes in the lens thickness have been proposed so far. For example, Japanese Laid-Open Utility Model Publication No. 62(1987)-164305 discloses a lens holding structure by which a plastic lens is supported in a lens barrel. In the disclosed lens holding structure, the circumferential surface of the plastic lens on one side thereof is held against a distal end surface of the lens barrel, thus positioning the lens along the optical axis thereof, and the plastic lens is resiliently pressed against the distal end surface of the lens mount by a sheet-like elastic member. Temperature-dependent changes in the lens thickness are absorbed by the sheet-like elastic member. However, the disclosed lens holding structure can only be used with the lens at the distal end of the lens mount, and is not applicable to the positioning of two lenses which are disposed close to each other.

Lens systems which comprise a plurality of lenses which are closely arranged and supported in a single lens mount (e.g., interchangeable lenses for high quality cameras) have very small gaps or clearances between the lenses. With such strict space limitations, the axial expansion of the synthetic resin lenses due to temperature changes poses a greater problem.

SUMMARY OF THE INVENTION

It is an object of the present invention to provide a lens holding structure for advantageously holding a plurality of lenses including a lens made of a material having a relatively large thermal expansion coefficient, in a lens holding member made of a material having a relatively small thermal expansion coefficient, while absorbing temperature-dependent dimensional changes.

Another object of the present invention is to provide a lens holding structure of the type described above which can hold a plurality of lenses in close relation to each other.

According to the present invention, there is provided a lens holding structure comprising a lens holding member, and a plurality of lenses supported in the lens holding structure with at least first and second lenses. A first reference mechanism in the lens holding structure establishes a first reference position to position the first lens therein with respect to the lens holding member. The first reference mechanism comprises a first limit surface for engaging at least partly an outer circumferential edge of the first lens to hold the first lens in directions perpendicular to an optical axis of the first lens, and a second limit surface for engaging at least partly an outer circumferential portion of one side surface of the first lens to hold the first lens in one direction along the optical axis of the first lens. A second reference mechanism, in the lens holding member, establishes a second reference position to position the second lens therein with respect to the lens holding member. The second reference mechanism comprises a third limit surface for engaging at least partly an outer circumferential edge of the second lens to hold the second lens in directions perpendicular to an optical axis of the second lens, and a fourth limit surface for engaging at least partly an outer circumferential portion of one side surface of the second lens to hold the second lens in one direction along the optical axis of the second lens. A first holding mechanism holds the first lens in the first reference position established by the first reference mechanism. A second holding means holds the second lens in the second reference position established by the second reference mechanism. The second holding mechanism comprises an elastic member which has a shape corresponding to the outer circumferential portion of the second lens and is engageable with an outer circumferential portion of an opposite side surface of the second lens to press the second lens against the fourth limit surface.

According to the present invention, there is also provided a lens holding structure comprising a lens holding member, and a first lens mounted in the lens holding member, a second lens mounted in the lens holding member. A first holding mechanism holds the first lens in the lens holding member against movement in axial and radial directions of the first lens. A second holding mechanism holds the second lens in the lens holding member in confronting relation to the first lens, against movement in a radial direction of the second lens, for movement toward the first lens and against movement away from the first lens in the axial direction of the second lens. An annular elastic member, disposed between the first and second lenses, biases the first and second lenses to move away from each other.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
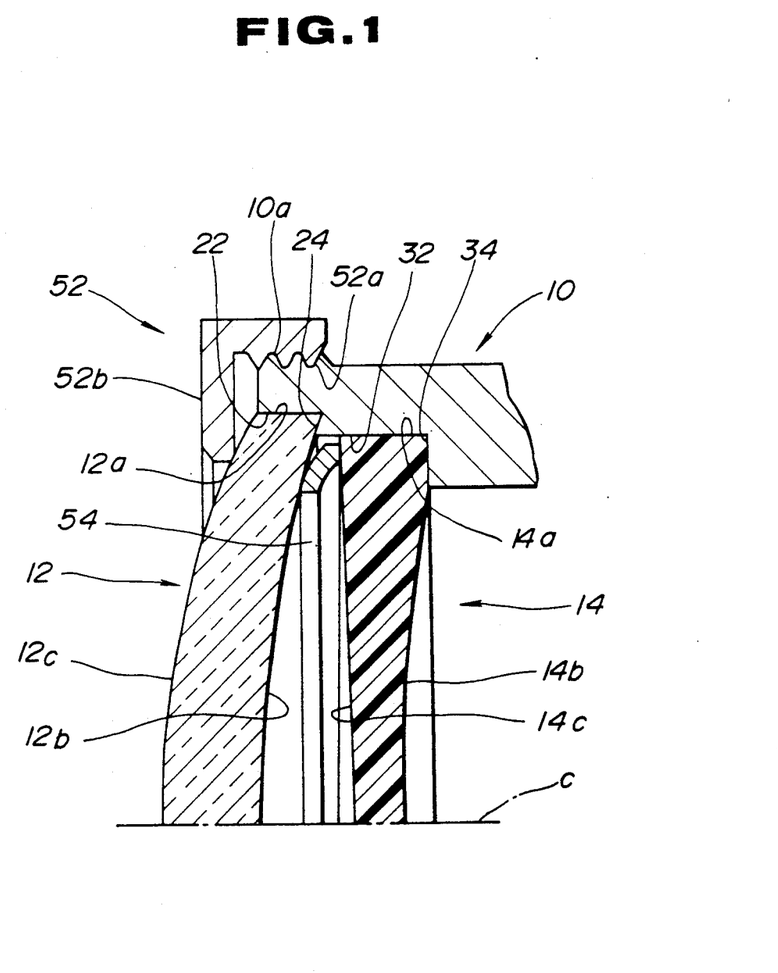
FIG. 1 is a fragmentary cross-sectional view of a lens holding structure according to a first embodiment of the present invention, with a lower half of the lens holding structure, which is the mirror image of an upper half thereof, being omitted from illustration for the sake of brevity.

FIG. 1 fragmentarily shows, in cross section, a lens holding structure according to a first embodiment of the present invention. FIG. 1 illustrates only an upper half of the lens holding structure above a central axial line c, with a lower half thereof, which is the mirror image of the upper half, being omitted from illustration. The lens holding structure shown in FIG. 1 is incorporated in a camera having a lens barrel 10 in which two lenses 12, 14 are supported.

The lens barrel 10 is substantially cylindrical in shape and is made of a metallic material such as an aluminum alloy or the like. The lens 12 is mounted in the outer end (lefthand end in FIG. 1) of the lens barrel 10 and comprises a circular convexo-concave lens made of glass. The lens 12 will hereinafter referred to as a "first lens". The lens 14 is mounted in the lens barrel 10 inwardly of the first lens 12 and comprises a circular double-concave lens made of synthetic resin such as polycarbonate. The lens 14 will hereinafter be referred to as a "second lens". The metallic material of the lens barrel 10 has a thermal expansion coefficient which is not greatly different from the thermal expansion coefficient of the glass of the first lens 12. However, the thermal expansion coefficient of the synthetic resin of the second lens 14 is considerably larger than those of the lens barrel 10 and the first lens 12.

The lens barrel 10 has an inner surface of revolution (i.e., a cylindrical inner surface) which is defined around a central axis (indicated by the central line c). The inner surface of the lens barrel 10 has reference portions which engage the first and second lenses 12, 14, respectively, thereby positioning these lenses 12, 14 with respect to the lens barrel 10.

More specifically, the reference portion for the first lens 12 comprises a first inner circumferential cylindrical surface 22 whose axis is aligned with the central axis c, and a first shoulder surface 24 contiguous to the first inner circumferential cylindrical surface 22. The first inner circumferential cylindrical surface 22 prevents the first lens 12 from moving in directions normal to the optical axis thereof, whereas the first shoulder surface 24 prevents the first lens 12 from moving along the optical axis thereof toward the inner end of the lens barrel 10 (i.e., to the right in FIG. 1). When the first lens 12 is engaged by the reference portion therefor (i.e., when the outer circumferential surface 12a of the first lens 12 is engaged by the first inner circumferential cylindrical surface 22 and the circumferential surface of the inner side surface 12b of the first lens 12 is engaged by the first shoulder surface 24), the optical axis of the first lens 12 and the central axis c of the lens barrel 10 are held in alignment with each other, and the first lens 12 is axially positioned with respect to the lens barrel 10 with sufficient accuracy by the first shoulder surface 24.

Likewise, the reference portion for the second lens 14 comprises a second inner circumferential cylindrical surface 32 whose axis is aligned with the central axis c, and a second shoulder surface 34 contiguous to the second inner circumferential cylindrical surface 32. The second inner circumferential cylindrical surface 32 prevents the second lens 14 from moving in directions normal to the optical axis thereof, whereas the second shoulder surface 34 prevents the second lens 14 from moving along the optical axis thereof toward the inner end of the lens barrel 10 (i.e., to the right in FIG. 1). When the second lens 14 is engaged by the reference portion thereof (i.e., when an outer circumferential surface 14a of the second lens 14 is engaged by the second inner circumferential cylindrical surface 32 and the circumferential surface of the inner side surface 14b of the second lens 14 is engaged by the second shoulder surface 34) the optical axis of the second lens 14 and the central axis c of the lens barrel 10 are held in alignment with each other, and the second lens 14 is axially positioned with respect to the lens barrel 10 with sufficient accuracy by the second shoulder surface 34.

A retainer ring 52 is mounted on the outer end of the lens barrel 10. The retainer ring 52 has an internal threaded annular portion 52a and an inner flange 52b integrally extending radially inwardly from the outer end of the retainer ring 52. When the retainer ring 52 is installed on the lens barrel 10, the internally threaded portion 52a is threaded over an externally threaded portion 10a of the outer end of the lens barrel 10, so that the retainer ring 52 is firmly fastened to the lens barrel 10. At this time, the inner flange 52b engages the circumferential portion of the outer side surface 12c of the first lens 12. Consequently, the first lens 12 is clamped and held in position between the retainer ring 52 and the first shoulder surface 24 of the lens barrel 10.

An annular elastic member 54 is disposed under axial compression between the first lens 12 and the second lens 14. As better shown in FIGS. 2 and 3, the elastic member 54 is in the form of a conical spring washer member and is made of a metallic material or a synthetic resin material which has a sufficient degree of elasticity. The outside diameter of the elastic member 54 is substantially the same as or slightly smaller than the outside diameter of the second lens 14. The elastic member 54 has a shape corresponding to a circumferential portion of the second lens 14. When the elastic member 54 is in its free state, it has a cross-sectional shape as indicated by the imaginary lines in FIG. 3, and has a thickness $t_0$ in the axial direction of the lens barrel 10. When the elastic member 54 is installed in position between the first and second lenses 12, 14, the elastic member 54 has a cross-sectional shape as indicated by the solid lines in FIG. 3, and has a thickness t in the axial direction of the lens barrel 10. The thickness of the elastic member 54 is reduced by an amount $\Delta t$ when the elastic member 54 is elastically compressed from the imaginary-line position to the solid-line position. When the elastic member 54 is installed in position, the compressed elastic member 54 engages the circumferential portion of an outer side surface 14c of the second lens 14, thus pressing the second lens 14 against the second shoulder surface 34. The second lens 14 is therefore securely clamped and held in position between the elastic member 54 and the second shoulder surface 34 of the lens barrel 10.

Figure 3:
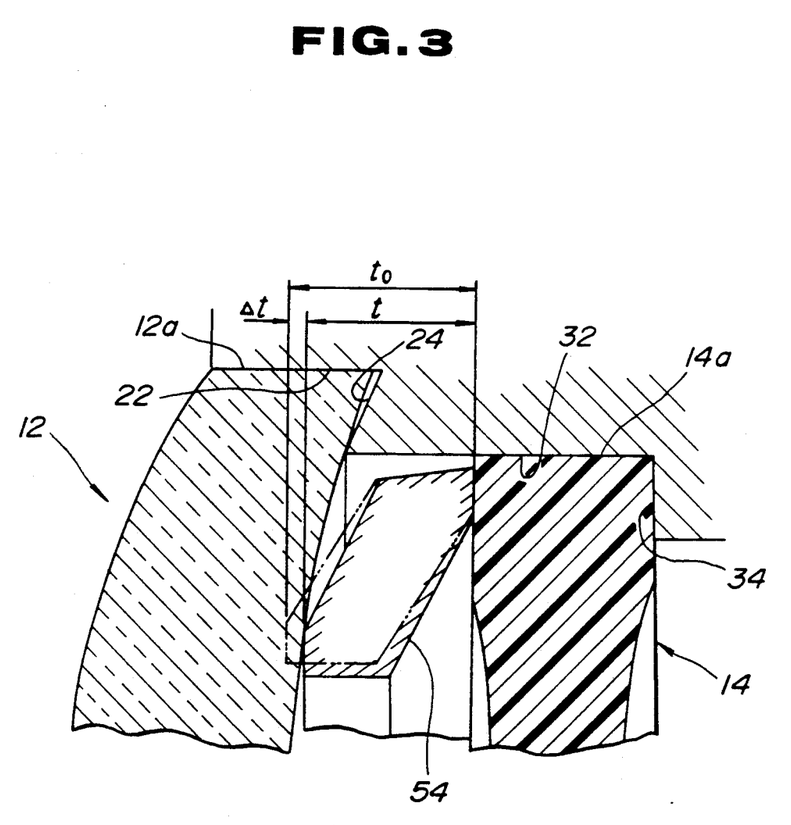
FIG. 3 is an enlarged fragmentary cross-sectional view of the lens holding structure shown in FIG. 1.

The amount $\Delta t$ by which the elastic member 54 is axially compressed when it is installed varies depending on the temperature, because the thermal expansion coefficient of the synthetic resin material of the second lens 14 is much larger than that of the metallic material of the lens barrel 10. Specifically, as the temperature increases, the compressed amount $\Delta t$ increases, and as the temperature decreases, the compressed amount $\Delta t$ decreases. The elastic member 54 which is in the form of a conical spring washer member in this embodiment is capable of coping with changes in the compressed amount $\Delta t$. In order to cope with changes in the compressed amount $\Delta t$, it is preferable that: 1) the elastic member be freely elastically deformable to a sufficiently large extent; 2) the force with which the elastic member presses the second lens vary only slightly even when the elastic member is elastically deformed greatly; and 3) the ability for the elastic member to be elastically deformable be not lost due to creep or the like after a long period of use. The conical spring washer member can well meet all the above requirements 1), 2), and 3). With regard to the requirement 2) in particular, the relationship between the compressed amount and the load which is borne by the conical spring washer member can be selected as desired by suitably determining the cross-sectional shape of the conical spring washer member. The cross-sectional shape of the conical spring washer member 54 used in this embodiment is selected to obtain an approximately constant load to be borne thereby over a certain range of compressed amounts in accordance with the ordinary knowledge which those skilled in the art have. The range in which temperature-dependent compressed amounts vary during usage of the camera is included in the above range of compressed amounts.

Since the load which is borne by the elastic member 54 is substantially constant in a relatively large range of compressed amounts, tolerances of various component dimensions which do not affect the performance of the camera, such as the thickness of the elastic member 54, the thickness of the lens at the circumferential portion thereof which is not effective to focus images but to hold the lens, and other dimensions can be increased. Accordingly, the cost required to mass-produce the lens holding structure can be reduced.

Figure 4:
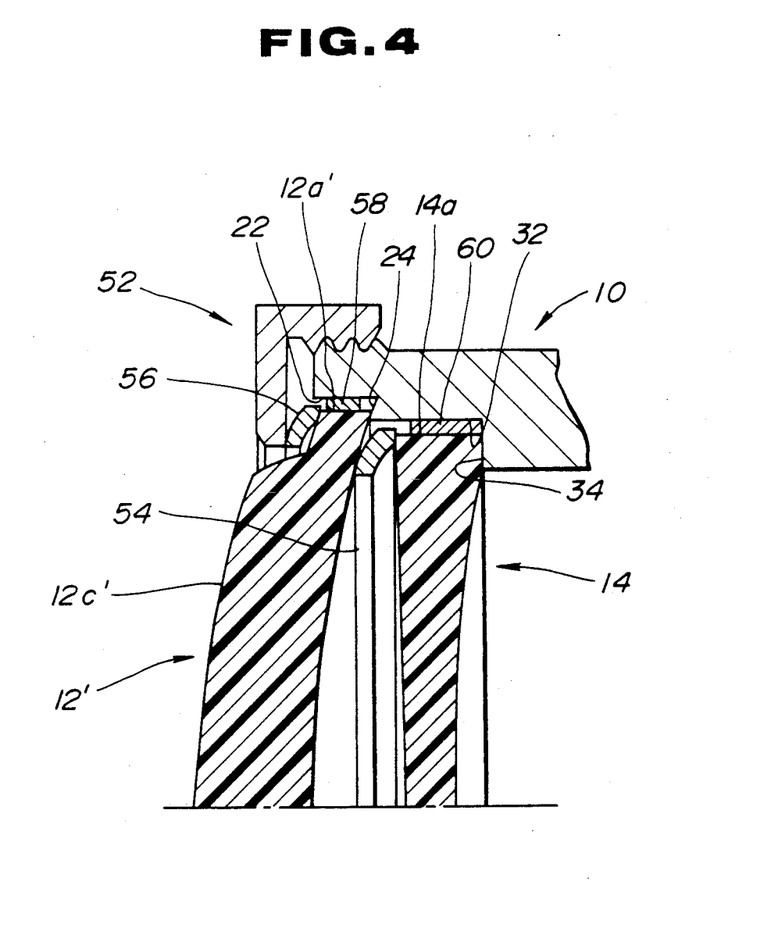
FIG. 4 is a fragmentary cross-sectional view of a lens holding structure according to a second embodiment of the present invention, with a lower half of the lens holding structure, which is the mirror image of an upper half thereof, being omitted from illustration for the sake of brevity.
Figure 5:
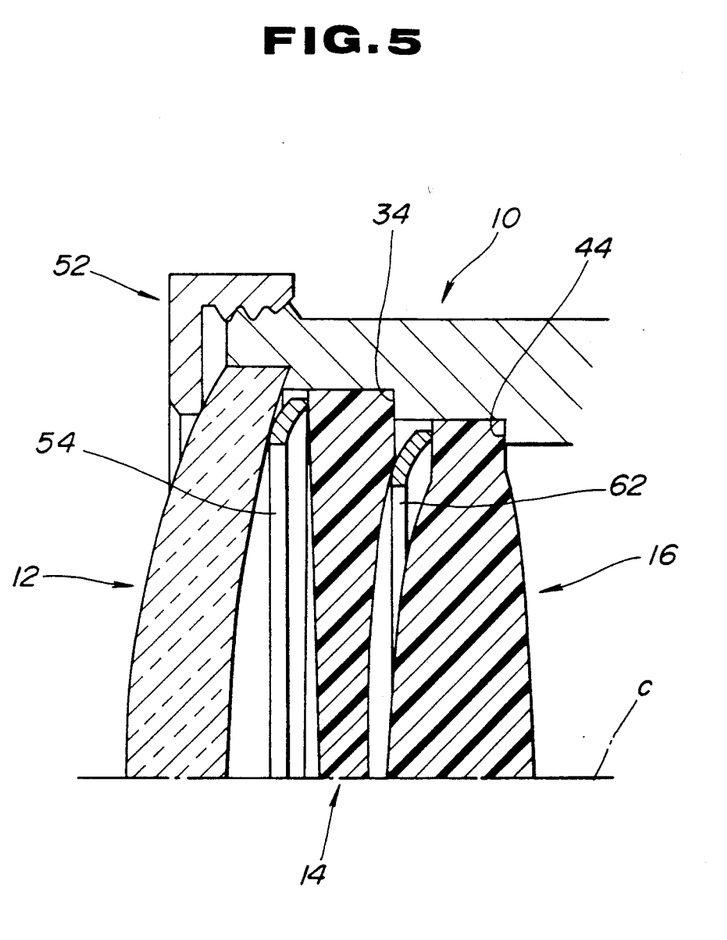
FIG. 5 is a fragmentary cross-sectional view of a lens holding structure according to a third embodiment of the present invention, with a lower half of the lens holding structure, which is the mirror image of an upper half thereof, being omitted from illustration for the sake of brevity.

FIGS. 4 and 5 show lens holding structures according to second and third embodiments, respectively, of the present invention. Those parts shown in FIGS. 4 and 5 which are identical or correspond to those in the first embodiment are denoted by identical reference numerals, some with primes, and will not be described in detail.

Figure 2:
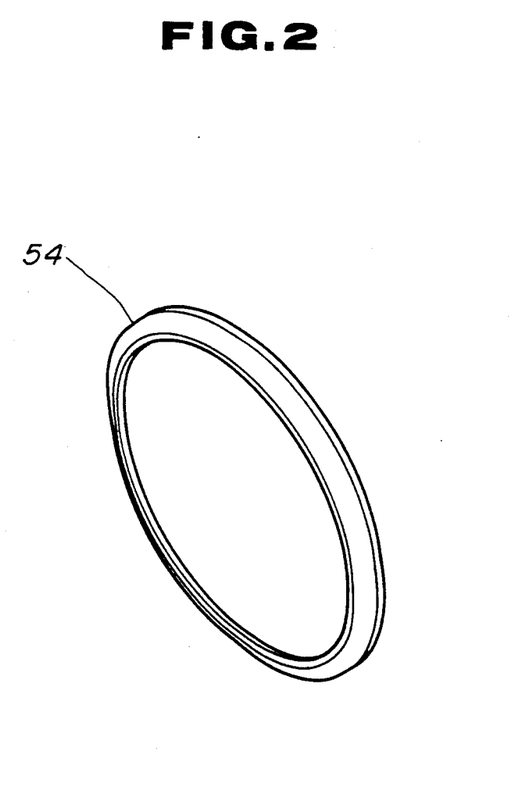
FIG. 2 is a perspective view of an annular elastic member in the lens holding structure shown in FIG. 1.

The lens holding structure shown in FIG. 4 differs from the lens holding structure shown in FIGS. 1 through 3 in that the first lens, denoted at 12', as well as the second lens 14 comprises a synthetic resin lens. In order to absorb temperature-dependent changes in the thickness of the first lens 12', an elastic member 56 in the form of a conical spring washer member is interposed between the retainer ring 52 and the outer side surface 12c' of the first lens 12'. The elastic member 56 is basically identical in structure to the elastic member 54 which is pressed against the second lens 14, but has a larger diameter than the diameter of the elastic member 54 and substantially the same diameter as the diameter of the first lens 12'. Therefore, the elastic member 56 has a shape corresponding to the circumferential portion of the first lens 12'. The shapes and compressed amounts of the elastic members 54, 56 are selected such that the elastic member 56, after being installed, exerts a greater resilient force than that of elastic member 54 for thereby pressing the first lens 12' against the first shoulder surface 24. The elastic member 56 is functionally identical to the elastic member 54 in that the elastic member 56 engages the circumferential portion of the outer side surface 12c' of the first lens 12', pressing the first lens 12' against the first shoulder surface 24. The first lens 12' is therefore clamped and held in position between the elastic member 56 and the first shoulder surface 24 of the lens barrel 10.

Radial gaps or clearances are defined between the outer circumferential edges 12a', 14a of the first and second lenses 12', 14 and the first and second inner circumferential cylindrical surfaces 22, 32 of the lens barrel 10. Annular spacers 58, 60 of an elastic material are fitted respectively in these gaps or clearances. The spacers 58, 60 are effective to absorb increases in the radial dimensions of the first and second lenses 12', 14 due to thermal expansion, so that the optical axes of these lenses are held in alignment with the central axis of the lens barrel 10 regardless of changes in the temperature. The spacers 58, 60 are advantageous when the optical axes of the lenses 12', 14 and the central axis of the lens barrel 10 are to be aligned highly accurately or when the inside diameters of the inner circumferential cylindrical surfaces 22, 32 of the lens barrel 10 and/or the outside diameters of the lenses 12', 14 are to have relatively large tolerances.

The lens holder structure shown in FIG. 5 is different from the lens holder structure shown in FIGS. 1 through 3 in that it additionally supports a third lens 16. The third lens 16 is made of synthetic resin and is held in position between an annular elastic member 62 and a third shoulder surface 44 of the lens barrel 10 in exactly the same manner as the second lens 14 is held in position. The elastic member 62 has a shape corresponding to the circumferential portion of the third lens 16. The shapes and compressed amounts of the elastic members 54, 62 are selected such that the resilient force applied by the elastic member 62 which is installed in place is smaller than the resilient force imposed by the elastic member 54, for thereby pressing the second lens 14 against the second shoulder surface 34. In this embodiment, therefore, a number of lenses can be mounted in the lens barrel 10 while being positioned closely to each other. The lens barrel 10 can have reference portions for accurately determining the positions of lenses to be supported therein, the reference positions being provided for the respective lenses, with the result that the overall lens system gives very high performance without depending on the ambient temperature.

As shown in FIG. 5, the diameter of the second lens 14 is smaller than the diameter of the first lens 12, and the diameter of the third lens 16 is smaller than the diameter of the second lens 14. Since the diameters of the lenses are progressively larger toward the outer end of the lens barrel 10, the reference portions for positioning the lenses can easily be formed in the lens barrel 10. In a lens system which is composed of plural lenses, generally, the lenses at the opposite ends of the lens barrel are larger in diameter than the central lens in the barrel. Therefore, the lens holding structure is particularly advantageous when incorporated in a lens system composed of many lenses.

With the present invention, as described above, the lens holding structure offers advantages when a plurality of lenses, including a synthetic resin lens having a large thermal expansion coefficient, are supported in a lens mount having a smaller thermal expansion coefficient. The present invention is also advantageously applicable to a lens holding structure which supports glass lenses whose thermal expansion coefficient is not so large.

In the above embodiments, the shoulder surfaces on the inner surface of the lens barrel engage the entire circumferential portions of side surfaces of the respective lenses, preventing the lenses from moving in one direction along the optical axes thereof. However, the shoulder surfaces may be replaced with projections or the like which only partly engage the circumferential portions of the side surfaces of the lenses. In addition, the lenses may be prevented from moving in directions normal to their optical axes by partial engagement with the outer circumferential edges of the lenses.

Although certain preferred embodiments have been shown and described, it should be understood that many changes and modifications may be made therein without departing from the scope of the appended claims

We claim:

1. A lens holding structure comprising:
   a) a lens holding member;
   b) a plurality of lenses supported in said lens holding member, said plurality of lenses including at least first and second lenses;
   c) first reference means in said lens holding member, for establishing a first reference position to position said first lens therein with respect to said lens holding member;
   d) said first reference means comprising a first limit surface for at least partly engaging an outer circumferential edge of said first lens to prevent said first lens from moving in a direction perpendicular to an optical axis of said first lens, and a second limit surface for at least partly engaging an outer circumferential portion of one side surface of said first lens to prevent said first lens from moving in a direction along said optical axis of said first lens, said second limit surface being a surface of said lens holding member;
   e) second reference means in said lens holding member, for establishing a second reference position to position said second lens with respect to said lens holding member;
   f) said second reference means comprising a third limit surface for at least partly engaging an outer circumferential edge of said second lens to prevent said second lens from moving in a direction perpendicular to an optical axis of said second lens, and a fourth limit surface for at least partly engaging an outer circumferential portion of one side surface of said second lens to prevent said second lens from moving in a direction along said optical axis of said second lens, said fourth limit surface being a surface of said lens holding member;
   g) first holding means for holding said first lens in said first reference position established by said first reference means;
   h) second holding means for holding said second lens in said second reference position established by said second reference means; and
   i) said second holding means comprising an elastic member which has a shape corresponding to the outer circumferential portion of said second lens and is engageable with an outer circumferential portion of an opposite side surface of said second lens to press said second lens against said fourth limit surface, said elastic member being disposed under compression between said first and second lenses, said elastic member comprising a conical spring washer member;

wherein said second lens is made of a material which has a larger thermal expansion coefficient than the thermal expansion coefficient of the material of said lens holding member, so that said conical spring washer member is elastically deformable to change the thickness thereof along an axis of said conical washer member when the temperature of said second lens varies, said conical spring washer member having a cross-sectional shape such that a load which is borne by said conical spring washer member is maintained at a substantially constant level when the thickness of the conical spring washer member changes.

2. A lens holding structure according to claim 1, wherein said lens holding member has an outer end, said first lens being positioned closer to said outer end of said lens holding member than said second lens, said first and second lenses being circular in shape, said first lens having a diameter larger than the diameter of said second lens.

3. A lens holding structure according to claim 1, wherein said first holding means comprises a retainer ring mounted on said lens holding member.

4. A lens holding structure according to claim 3, wherein said lens holding member has an outer end, said first lens being positioned closer to said outer end of said lens holding member than said second lens, said first and second lenses being circular in shape, said first lens having a diameter larger than the diameter of said second lens.

5. A lens holding structure according to claim 1, wherein said first holding means comprises an elastic member and a retainer ring mounted on said lens holding member, said elastic member having a shape corresponding to an outer circumferential portion of said first lens, said elastic member being disposed under compression between said first lens and said retainer ring, said elastic member engaging a circumferential portion of an opposite side surface of said first lens to press said first lens against said second limit surface.

6. A lens holding structure according to claim 1, wherein said first lens is made of glass and said second lens is made of synthetic resin.

7. A lens holding structure comprising:
a) a lens holding member;
b) a plurality of lenses supported in said lens holding member, said plurality of lenses including at least first and second lenses;
c) first reference means in said lens holding member, for establishing a first reference position to position said first lens therein with respect to said lens holding member;
d) said first reference means comprising a first limit surface for at least partly engaging an outer circumferential edge of said first lens to prevent said first lens from moving in a direction perpendicular to an optical axis of said first lens, and a second limit surface for at least partly engaging an outer circumferential portion of one side surface of said first lens to prevent said first lens from moving in a direction along said optical axis of said first lens;
e) second reference means in said lens holding member, for establishing a second reference position to position said second lens with respect to said lens holding member;

f) said second reference means comprising a third limit surface for at least partly engaging an outer circumferential edge of said second lens to prevent said second lens from moving in a direction perpendicular to an optical axis of said second lens, and a fourth limit surface for at least partly engaging an outer circumferential portion of one side surface of said second lens to prevent said second lens from moving in a direction along said optical axis of said second lens;
g) first holding means for holding said first lens in said first reference position established by said first reference means, said first holding means comprising an elastic member and a retainer ring mounted on said lens holding member, said elastic member having a shape corresponding to an outer circumferential portion of said first lens, said elastic member being disposed under compression between said first lens and said retainer ring, said elastic member engaging a circumferential portion of an opposite side surface of said first lens to press said first lens against said second limit surface, said elastic member comprising a conical spring washer member;
h) second holding means for holding said second lens in said second reference position established by said second reference means; and
i) said second holding means comprising an elastic member which has a shape corresponding to the outer circumferential portion of said second lens and is engageable with an outer circumferential portion of an opposite side surface of said second lens to press said second lens against said fourth limit surface;

wherein said second lens is made of a material which has a larger thermal expansion coefficient than the thermal expansion coefficient of the material of said lens holding member, so that said conical spring washer member is elastically deformable to change the thickness thereof along an axis of said conical spring washer member when the temperature of said second lens varies, said conical spring washer member having a cross-sectional shape such that a load which is borne by said conical spring washer member is maintained at a substantially constant level when the thickness of the conical spring washer member changes.

8. A lens holding structure according to claim 7, wherein said elastic member is disposed under compression between said first and second lenses.

9. A lens holding structure comprising:
a) a lens holding member;
b) a plurality of lenses supported in said lens holding member, said plurality of lenses including at least first and second lenses, said first lens being made of glass and said second lens being made of synthetic resin;
c) first reference means in said lens holding member, for establishing a first reference position to position said first lens therein with respect to said lens holding member;
d) said first reference means comprising a first limit surface for at least partly engaging an outer circumferential edge of said first lens to prevent said first lens from moving in a direction perpendicular to an optical axis of said first lens, and a second limit surface for at least partly engaging an outer circumferential portion of one side surface of said first lens to prevent said first lens from moving in a direction along said optical axis of said first lens;

e) second reference means in said lens holding member, for establishing a second reference position to position said second lens with respect to said lens holding member;

f) said second reference means comprising a third limit surface for at least partly engaging an outer circumferential edge of said second lens to prevent said second lens from moving in a direction perpendicular to an optical axis of said second lens, and a fourth limit surface for at least partly engaging an outer circumferential portion of one side surface of said second lens to prevent said second lens from moving in a direction along said optical axis of said second lens;

g) first holding means for holding said first lens in said first reference position established by said first reference means;

h) second holding means for holding said second lens in said second reference position established by said second reference means; and i) said second holding means comprising an elastic member which has a shape corresponding to the outer circumferential portion of said second lens and is engageable with an outer circumferential portion of an opposite side surface of said second lens to press said second lens against said fourth limit surface.

10. A lens holding structure according to claim 9, wherein said elastic member is disposed under compression between said first and second lenses.

11. A lens holding structure according to claim 9, wherein said elastic member comprises a conical spring washer member.

12. A lens holding structure according to claim 11, wherein the synthetic resin of said second lens has a larger thermal expansion coefficient than the thermal expansion coefficient of the material of said lens holding member, so that said conical spring washer member is elastically deformable to change the thickness thereof along an axis of said conical spring washer member when the temperature of said second lens varies, said conical spring washer member having a cross-sectional shape such that a load which is borne by said conical spring washer member is maintained at a substantially constant level when the thickness of the conical spring washer member changes.

13. A lens holding structure according to claim 9, wherein said first holding means comprises a retainer ring mounted on said lens holding member.

14. A lens holding structure comprising:

a) a lens holding member;

b) a plurality of lenses supported in said lens holding member, said plurality of lenses including at least first and second lenses, said first lens being made of glass and said second lens being made of synthetic resin;

c) first reference means in said lens holding member, for establishing a first reference position to position said first lens therein with respect to said lens holding member;

d) said first reference means comprising a first limit surface for at least partly engaging an outer circumferential edge of said first lens to prevent said first lens from moving in a direction perpendicular to an optical axis of said first lens, and a second limit surface for at least partly engaging an outer circumferential portion of one side surface of said first lens to prevent said first lens from moving in a direction along said optical axis of said first lens, said second limit surface being a surface of said lens holding member;

e) second reference means in said lens holding member, for establishing a second reference position to position said second lens with respect to said lens holding member;

f) said second reference means comprising a third limit surface for at least partly engaging an outer circumferential edge of said second lens to prevent said second lens from moving in a direction perpendicular to an optical axis of said second lens, and a fourth limit surface for at least partly engaging an outer circumferential portion of one side surface of said second lens to prevent said second lens from moving in a direction along said optical axis of said second lens, said fourth limit surface being a surface of said lens holding member;

g) first holding means for holding said first lens in said first reference position established by said first reference means;

h) second holding means for holding said second lens in said second reference position established by said second reference means; and i) said second holding means comprising an elastic member which has a shape corresponding to the outer circumferential portion of said second lens and is engageable with an outer circumferential portion of an opposite side surface of said second lens to press said second lens against said fourth limit surface.

15. A lens holding structure according to claim 14, wherein said elastic member is disposed under compression between said first and second lenses.

16. A lens holding structure according to claim 15, wherein said elastic member comprises a conical spring washer member.

17. A lens holding structure according to claim 16, wherein said glass of said second lens has a larger thermal expansion coefficient than the thermal expansion coefficient of the material of said lens holding member, so that said conical spring washer member is elastically deformable to change the thickness thereof along an axis of said conical washer member when the temperature of said second lens varies, said conical spring washer member having a cross-sectional shape such that a load which is borne by said conical spring washer member is maintained at a substantially constant level when the thickness of the conical spring washer member changes.

* * * * *